United States Patent
Tsao et al.

(10) Patent No.: US 11,956,151 B2
(45) Date of Patent: Apr. 9, 2024

(54) TRANSMISSION CONTROL PROTOCOL FLOW CONTROL METHOD AND DEVICE FOR PERFORMING THE METHOD

(71) Applicant: INDUSTRIAL TECHNOLOGY RESEARCH INSTITUTE, Hsinchu (TW)

(72) Inventors: Po-Jui Tsao, Taipei (TW); Chuan-Yu Cho, Hsinchu (TW); Chun-Chieh Huang, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 138 days.

(21) Appl. No.: 17/560,014

(22) Filed: Dec. 22, 2021

(65) Prior Publication Data

US 2023/0198904 A1    Jun. 22, 2023

(51) Int. Cl.
*H04L 47/12*  (2022.01)
*H04L 47/32*  (2022.01)
*H04L 69/16*  (2022.01)

(52) U.S. Cl.
CPC ............ *H04L 47/12* (2013.01); *H04L 47/323* (2013.01); *H04L 69/16* (2013.01)

(58) Field of Classification Search
CPC ........ H04L 47/12; H04L 47/323; H04L 69/16
See application file for complete search history.

(56) References Cited

U.S. PATENT DOCUMENTS

| 9,385,960 B2 | 7/2016 | Wang et al. |
| 2008/0273554 A1 | 11/2008 | Shao et al. |
| 2011/0128853 A1 * | 6/2011 | Nishimura ............... H04L 47/11 370/235 |
| 2011/0264905 A1 | 10/2011 | Ovsiannikov |
| 2012/0163161 A1 | 6/2012 | Zhang et al. |
| 2015/0117200 A1 * | 4/2015 | Patel ...................... H04L 47/27 370/235 |

(Continued)

FOREIGN PATENT DOCUMENTS

| CN | 102948131 A | 2/2013 |
| CN | 109167734 A | 1/2019 |

(Continued)

OTHER PUBLICATIONS

Ha et al., "CUBIC: a new TCP-friendly high-speed TCP variant" ACM SIGOPS Operating Systems Review, vol. 42, No. 5, Jul. 1, 2008.

(Continued)

*Primary Examiner* — Huy D Vu
*Assistant Examiner* — Robert Ma
(74) *Attorney, Agent, or Firm* — Maschoff Brennan

(57) ABSTRACT

A transmission control protocol (TCP) flow control method is provided, which comprises: sending a data packet from a packet processor to a receiver and storing a copy of the data packet; receiving a current ACK packet with a current packet number; determining whether the current packet number is identical to a last packet number and whether a last substitute ACK packet generated by the input ACK filter exists; and performing steps respectively corresponding to different results of this determination to avoid TCP congestion control timely. A TCP flow control device performing the method is also disclosed.

9 Claims, 8 Drawing Sheets

(56) References Cited

U.S. PATENT DOCUMENTS

2016/0056927 A1 2/2016 Liu et al.
2019/0334825 A1* 10/2019 Nádas .................. H04L 69/163
2021/0092068 A1 3/2021 Ismailsheriff et al.

FOREIGN PATENT DOCUMENTS

KR 101767913 B1 8/2017
WO 2018184503 A1 10/2018

OTHER PUBLICATIONS

Gerofi et al., "Enhancing top throughputof highly available virtual machines via speculative communication" Mar. 3, 2012, VEE/12.
Brakmo et al., "TCP vegas: End to end congestion avoidance on a global internet" IEEE Journal on Selected Areas in Communications, vol. 13 No. 8, Oct. 1995.
Fu et al., "TCP Veno: TCP enhancement for transmission over wireless access networks" IEEE Journal on Selected Areas in Communications, vol. 21, No. 2, Feb. 2003.
J. Iyengar, Ed., I. Swett, Ed., Quic Loss Detection and Congestion Control, May 31, 2021.
Taiwan Office Action issued in corresponding application No. 111106553, dated Nov. 16, 2022.

\* cited by examiner

TRANSMISSION CONTROL PROTOCOL FLOW CONTROL METHOD AND DEVICE FOR PERFORMING THE METHOD

TECHNICAL FIELD

The disclosure relates to a Transmission Control Protocol (TCP) flow control method and device for performing the method.

BACKGROUND

In a wireless network environment such as the 5G wireless communication network, data transmission may suffer from signal loss due to object obstruction, high speed movement or proximity to the base station, thus causing the packet loss. When the packet loss occurs, the packet processor performing data transmission based on TCP determines that there is congestion in the wireless communication network, and thus reduces the transmission rate. The above operation is also referred to as the TCP congestion control.

The current Linux kernel is built-in with five types of congestion control algorithms, including Reno, Vegas, Westwood, Binary Increase Congestion Control (BIC), and CUBIC, among which CUBIC is mostly used as the default congestion control method. About 5% of the packets are found lost in the signal transmission can initiate the TCP congestion control method according to the 5G regulations. As a result, the transmission speed will drop below 30% of the original, while the bandwidth still retains approximately 95% health of the ideal state, which can be known from the user datagram protocol (hereinafter UDP). However, a packet processor performing data transmission based on UDP, cannot verify the data correctness. Hence, there is a need for a control mechanism to prevent a TCP-based packet processor from entering the congestion control state, so that the transmission speed can be ensured.

SUMMARY

According to an embodiment of the disclosure, a TCP flow control method is provided. The method includes: sending a data packet from a packet processor to a receiver and storing a copy of the data packet in an output data buffer; receiving a current ACK packet with a current packet number by an input ACK filter after the data packet is sent; determining whether the current packet number is identical to a last packet number of a last ACK packet and whether a last substitute ACK packet with a last substitute number exists by the input ACK filter; when the current packet number is different from the last packet number and there is no last substitute ACK packet, sending the current ACK packet to the packet processor by the input ACK filter; when the current packet number is different from the last packet number and the last substitute ACK packet exists, determining whether the current packet number is larger than or equal to the last substitute number by the input ACK filter; when the current packet number is determined as larger than or equal to the last substitute number, sending the current ACK packet to the packet processor by the input ACK filter; and when the current packet number is identical to the last packet number or when the current packet number is determined as smaller than the last substitute number, resending the data packet to the receiver, generating a current substitute ACK packet, and selectively sending the current substitute ACK packet to the packet processor.

According to another embodiment of the disclosure, a TCP flow control device is provided. The device includes an output data buffer and an input ACK filter. The output data buffer is configured to communicatively connect between a packet processor and a receiver, stores a copy of a data packet sent from the packet processor to the receiver, and, based on the copy, resends the data packet to the receiver when receiving a resending command. The input ACK filter is configured to communicatively connect to the output data buffer and between the packet processor and the receiver, receives a current ACK packet with a current packet number, and determines whether the current packet number is identical to a last packet number of a last ACK packet and whether a last substitute ACK packet with a last substitute number exists by the input ACK filter. When the current packet number is different from the last packet number and there is no last substitute ACK packet, the input ACK filter sends the current ACK packet to the packet processor. When the current packet number is different from the last packet number and the last substitute ACK packet exists, the input ACK filter determines whether the current packet number is larger than or equal to the last substitute number. When the current packet number is determined as larger than or equal to the last substitute number, the input ACK filter sends the current ACK packet to the packet processor. When the current packet number is identical to the last packet number or when the current packet number is determined as smaller than the last substitute number, the output data buffer resends the data packet to the receiver, and the input ACK filter generates a current substitute ACK packet and selectively sends the current substitute ACK packet to the packet processor.

The above description of the invention and the following detailed description are used to demonstrate and explain the spirit and principle of the invention, and provide a further explanation of the claims of the disclosure.

BRIEF DESCRIPTION OF THE DRAWINGS

The invention will become more fully understood from the detailed description given hereinbelow and the accompanying drawings which are given by way of illustration only and thus are not limitative of the invention and wherein.

DETAILED DESCRIPTION

In the following detailed descriptions, the detailed features and advantages of the disclosure are described, and the contents are sufficient to make one skilled in the art understand the technical contents thereof and practice them accordingly. According to the contents disclosed in this specification, scope of claims and drawings, any person skilled in the art can easily understand the purpose and advantages of the disclosure. The following embodiments further illustrate aspects of the invention in details, but this is not meant to limit the scope of the invention in any kind of manner.

Figure 1A:
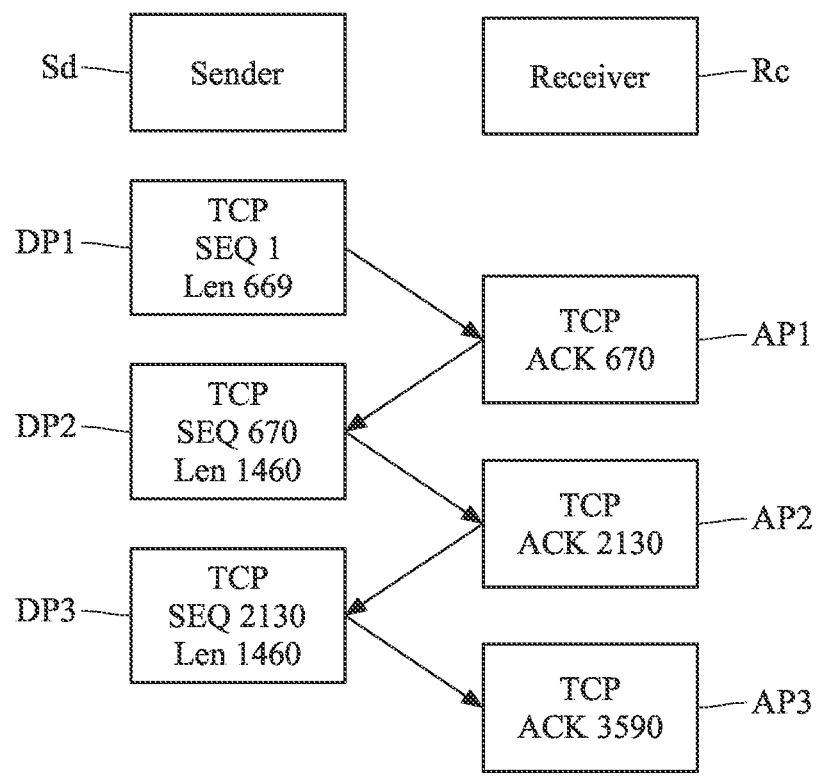
FIG. 1A is a diagram illustrating the data transmission via TCP in a normal state.
Figure 1B:
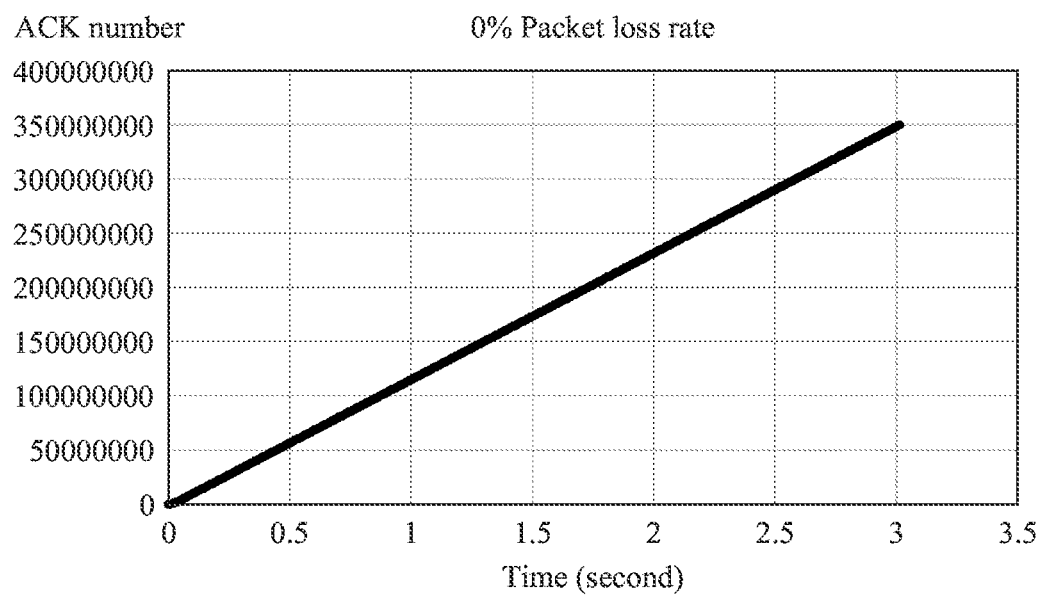
FIG. 1B is a curve diagram illustrating the sequence numbers of returned ACK packets when the TCP data transmission is normal (0% packet loss rate).

Please refer to FIG. 1A and FIG. 1B, wherein FIG. 1A is a diagram illustrating the data transmission via TCP in a normal state, while FIG. 1B shows a curve diagram illustrating the sequence numbers of returned ACK packets when the TCP data transmission is normal; namely, the packet loss rate is 0%. As illustrated in FIG. 1A, when the data transmission via TCP works in a normal state, data packets are sequentially transmitted from a sender Sd to a receiver Rc, and the receiver Rc returns ACK packets in response to the data packets. For example, as shown in FIG. 1A, a data packet DP1 is firstly sent by the sender Sd, and the receiver Rc will return an ACK packet AP1 with a packet number related to the data packet DP1 back to the sender Sd, while the packet number shows an expected number next to the end number of the data packet DP1, so as to indicate a safe receipt of the data packet DP1. Either after the sender Sd receives the ACK packet AP1 or not, the sender Sd further sends a data packet DP2 to the receiver Rc, and the receiver Rc sends an ACK packet AP2 once receiving the data packet DP2. The data transmission keeps going on in this way until all of the data packets in a TCP stack run out without packet loss, that is, as shown in FIG. 1A, all of the data packets DP1, DP2 and DP3 are safely received by the receiver Rc and all of the ACK packets AP1, AP2 and AP3 are safely received by the sender Sd. It is shown by FIG. 1B that, since there is no congestion in data transmission, the receiver Rc keeps returning ACK packets with different and increasing sequence numbers back to the sender Sd.

Figure 2A:
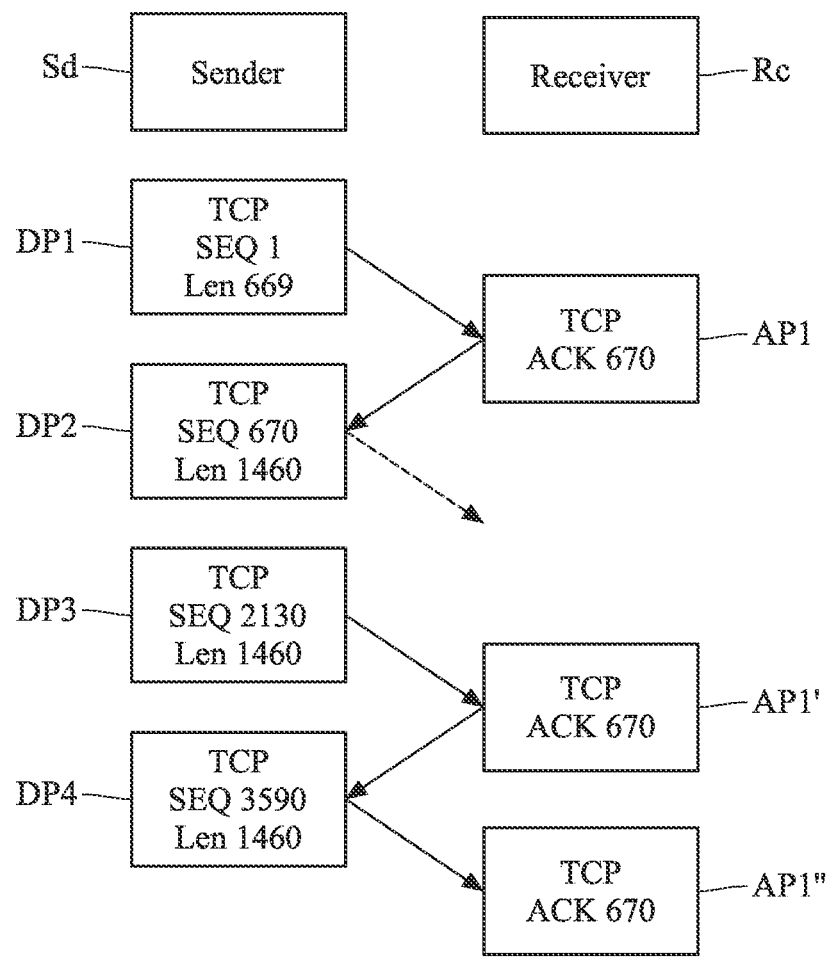
FIG. 2A is a diagram illustrating the situation where packet loss occurs in the data transmission via TCP.
Figure 2B:
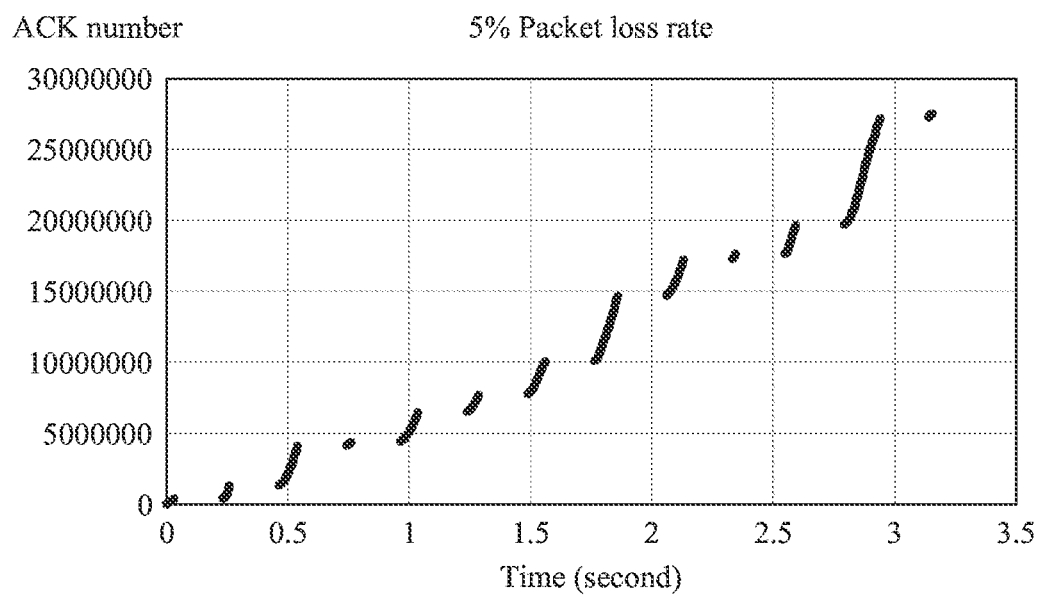
FIG. 2B is a curve diagram illustrating the sequence numbers of returned ACK packets when the TCP transmission has 5% packet loss rate.

Contrarily, the state of data transmission with packer loss is shown in FIG. 2A and FIG. 2B, while FIG. 2A is a diagram illustrating the situation where packet loss occurs and FIG. 2B shows a curve diagram illustrating the sequence numbers of returned ACK packets when the TCP transmission has 5% packet loss rate. As the example shown in FIG. 2A, after receiving the ACK packet AP1, the sender Sd sends the data packet DP2 out to the receiver Rc, but packet loss occurs and thus the receiver Rc does not either receive or be aware of the data packet DP2. Thereafter, once the receiver Rc receives a further data packet DP3 from the sender Sd, the receiver Rc finds that the data packet DP2 is lost and thus sends an ACK packet AP1' back to the sender Sd. The ACK packet AP1' still has a packet number related to the data packet DP1 so as to inform the sender Sd that the data packet DP2 is lost and may be resent. In TCP-based data transmission, the ACK packet AP1' not only includes the packet number related to the data packet DP1, but also includes a SACK data showing the information about the data packet(s) received after the receiver Rc senses the loss of the data packet DP2. Taking what is shown in FIG. 2A as an example, both of the ACK packets AP1' and AP1" return the packet number showing the expected number next to the end number of the data packet DP1 since the data packet DP2 is not yet received, but the SACK data in these two ACK packets AP1' and AP1" are different. The SACK data of the ACK packet AP1' is "2130-3589", which shows the start number and the end number of the data packet DP3, the data packet received by the receiver Rc after the packet loss of the data packet DP2 occurs. However, the SACK data of the ACK packet AP1" is "2130-5049", which shows the start number of the data packet DP3 and the end number of the data packet DP4. It is shown by FIG. 2B that, with 5% packet loss rate, the curve of data transmission is divided into several segments, and the receiver Rc frequently returns ACK packets with the same sequence numbers back to the sender Sd.

Figure 3:
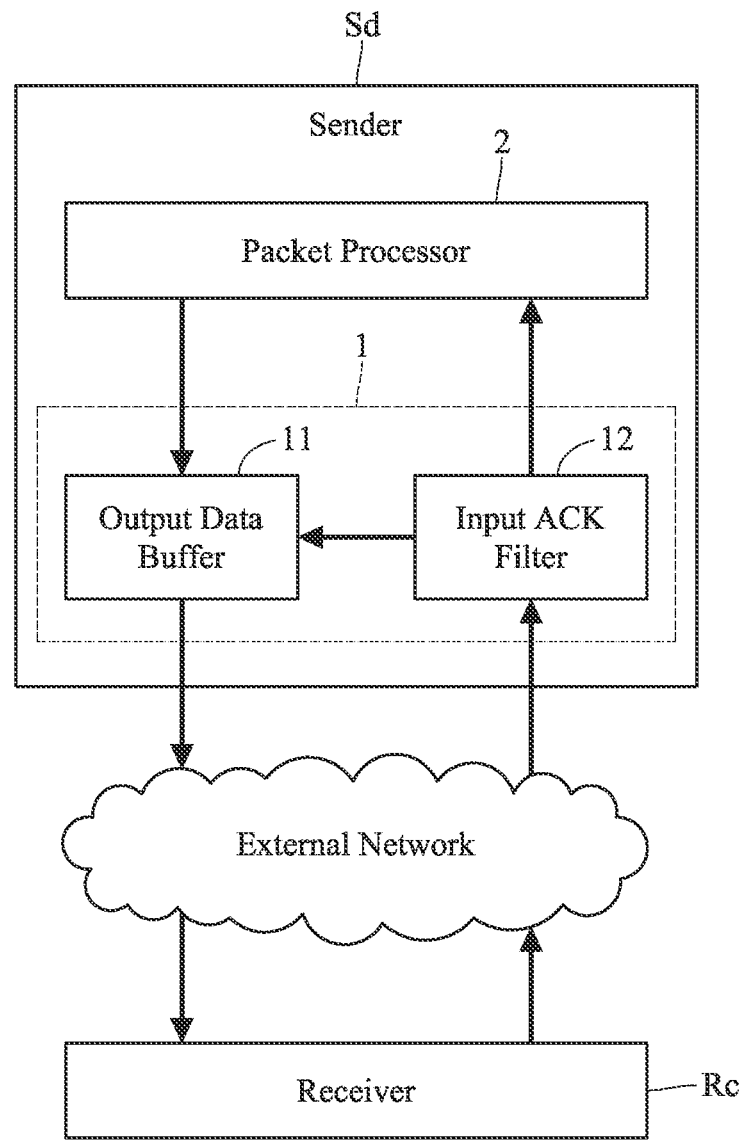
FIG. 3 is a block diagram illustrating the structure of a TCP flow control device in accordance with an embodiment of the disclosure.

Please refer to FIG. 3, which is a block diagram illustrating the structure of a TCP flow control device in accordance with an embodiment of the disclosure, which is applied to a network of 5G architecture. In this embodiment, the TCP flow control device 1 is adapted to a sender Sd and communicatively connects between a packet processor 2 of the sender Sd and a receiver Rc. As shown in FIG. 3, the TCP flow control device 1 includes an output data buffer 11 and an input ACK filter 12, while the output data buffer 11 communicatively connects between the packet processor 2 and the receiver Rc, and the input ACK filter 12 communicatively connects to the output data buffer 11 and between the packet processor 2 and the receiver Rc. In this embodiment, the communication between the output data buffer 11 and the input ACK filter 12 may be performed via a direct interconnection. However, alternatively, these two elements of the TCP flow control device 1 may communicatively connect through the packet processor 2 instead of direct interconnection.

Figure 4:
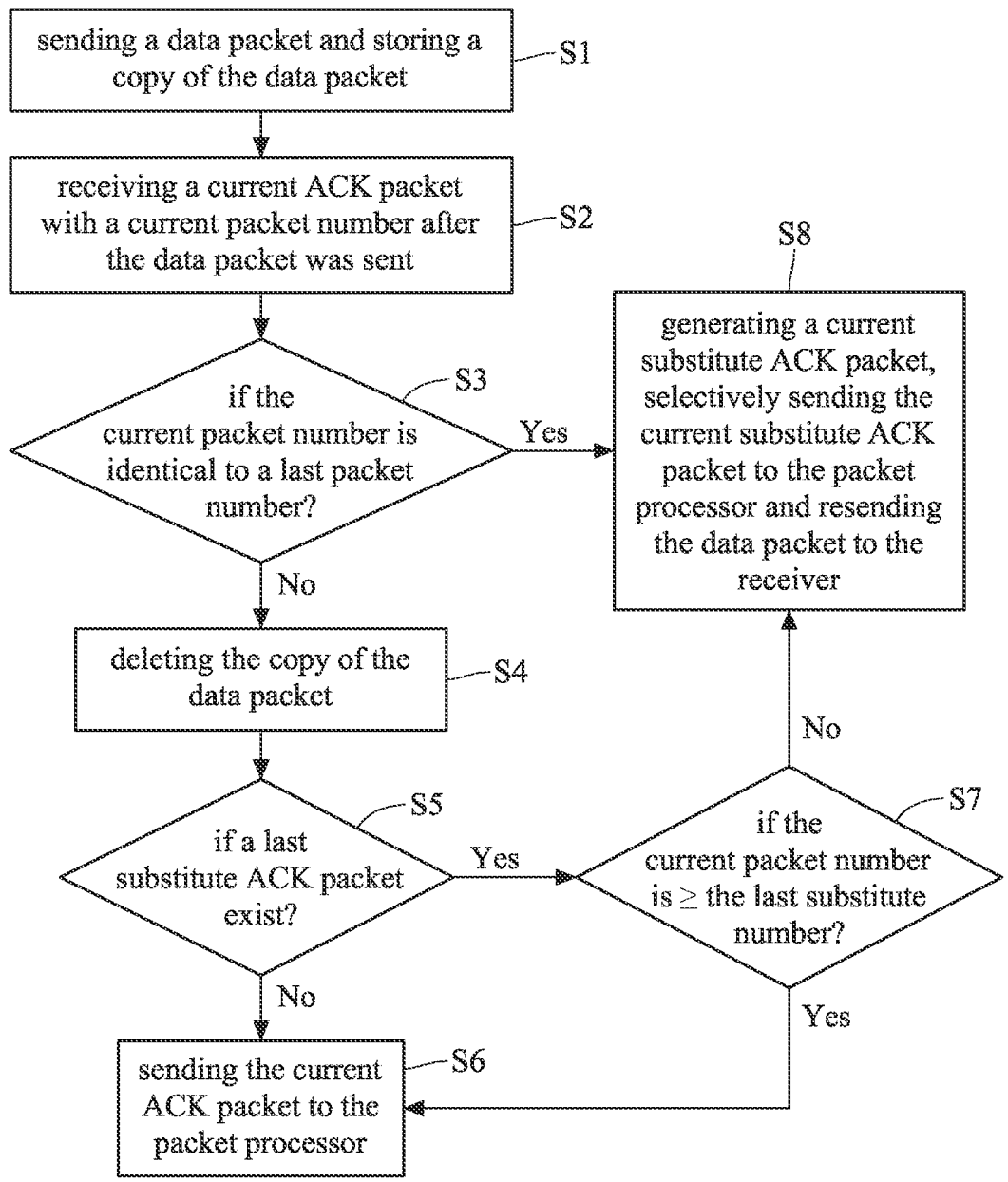
FIG. 4 is a flowchart illustrating an embodiment of a TCP flow control method can be performed by the TCP flow control device shown in FIG. 3.

Please refer to FIG. 3 and FIG. 4, wherein FIG. 4 shows a flowchart of an embodiment of a TCP flow control method can be performed by the TCP flow control device 1 shown in FIG. 3. In this embodiment, the TCP flow control method of the disclosure may include Step S1 through Step S8 illustrated as the follows. Furthermore, the TCP flow control method is to firstly determine whether the current packet number is identical to a last packet number and whether a last substitute ACK packet generated by the input ACK filter 12 exists, and then performs steps respectively corresponding to different results of this determination. The last packet number and last substitute ACK packet will be introduced in detail later.

In Step S1, the sender Sd sends a data packet from the packet processor 2 to the receiver Rc via a network, and the sender Sd also stores a copy of the data packet in the output data buffer 11. Although it is shown that the packet processor 2 sends the data packet out by the output data buffer 11 in FIG. 3, alternatively, the packet processor 2 may send it out without passing through the output data buffer 11 and store the copy into the output data buffer 11 independently.

In Step S2, the input ACK filter 12 receives a current ACK packet with a current packet number after the data packet mentioned is sent in Step S1. Depending on the situation of data transmission, this current ACK packet can be an ACK packet like the ACK packet AP1 shown in both of FIGS. 1A and 2A if the data transmission performed without packet loss, or like the ACK packet AP1' or AP1" in FIG. 2A if packet loss occurs.

In Step S3, the input ACK filter 12 determines whether the current packet number of the current ACK packet is identical to the last packet number. The last packet number may be the packet number of a last ACK packet received before the current ACK packet, so as to decide if the copy of the data packet in the output data buffer 11 can be deleted.

In Step S4, when the current packet number is different from the last packet number, the copy of the data packet in the output data buffer 11 may be accordingly deleted. This Step S4 is an optional step and may be skipped if the available storage space in the output data buffer 11 is still enough. The input ACK filter 12 may generate a deleting command and send it to the output data buffer 11 directly or through the packet processor 2, so that the output data buffer 11 can delete the copy of the data packet accordingly.

Continuing to Step S4 or to Step S3 if Step S4 is skipped, in Step S5, the input ACK filter 12 further determines whether there is the last substitute ACK packet when the current packet number is different from the last packet number. The last substitute ACK packet is a ACK packet optionally generated by the input ACK filter 12 after the last ACK packet is received, has a packet number mentioned as last substitute number hereinafter, and will be introduced in detail later. With this Step S5, the input ACK filter 12 may determines whether sending the current ACK packet back to the packet processor 2 may possibly initiate the TCP congestion control even though the current packet number is different from the last packet number.

In Step S6, when no last substitute ACK packet is identified in Step S5, the input ACK filter 12 sends the current ACK packet to the packet processor 2, which is like the ACK packet AP1 or AP2 shown in FIG. 1A and will not make the packet processor 2 initiates the TCP congestion control. On the contrary, in Step S7, when the last substitute ACK packet is identified in Step S5, the input ACK filter 12 further determines whether the current packet number is larger than or equal to the last substitute number. When the result of the determination in Step S7 is positive, that is, the current packet number is larger than or equal to the last substitute number, Step S6 is then performed. However, when the result of the determination in Step S7 is negative, a later-introduced Step S8 will be performed.

In Step S8, when the current packet number is determined as identical to the last packet number in Step S3 or when the current packet number is determined as smaller than the last substitute number in Step S7, the input ACK filter 12 generates a current substitute ACK packet, selectively sends the current substitute ACK packet to the packet processor 2, and let the data packet to be accordingly resent to the receiver Rc based on the copy in the output data buffer 11. With the above Step S8, the input ACK filter 12 may send a current substitute ACK packet instead of the current ACK packet to the packet processor 2, with a packet number of the current substitute ACK packet (mentioned as current substitute number hereinafter) larger than the current packet number at least, so as to avoid the initiate of TCP congestion control. Furthermore, in this embodiment, the input ACK filter 12 may generate a resending command and send it to the output data buffer 11 so as to command the output data buffer 11 to resend the lost data packet.

Figure 5:
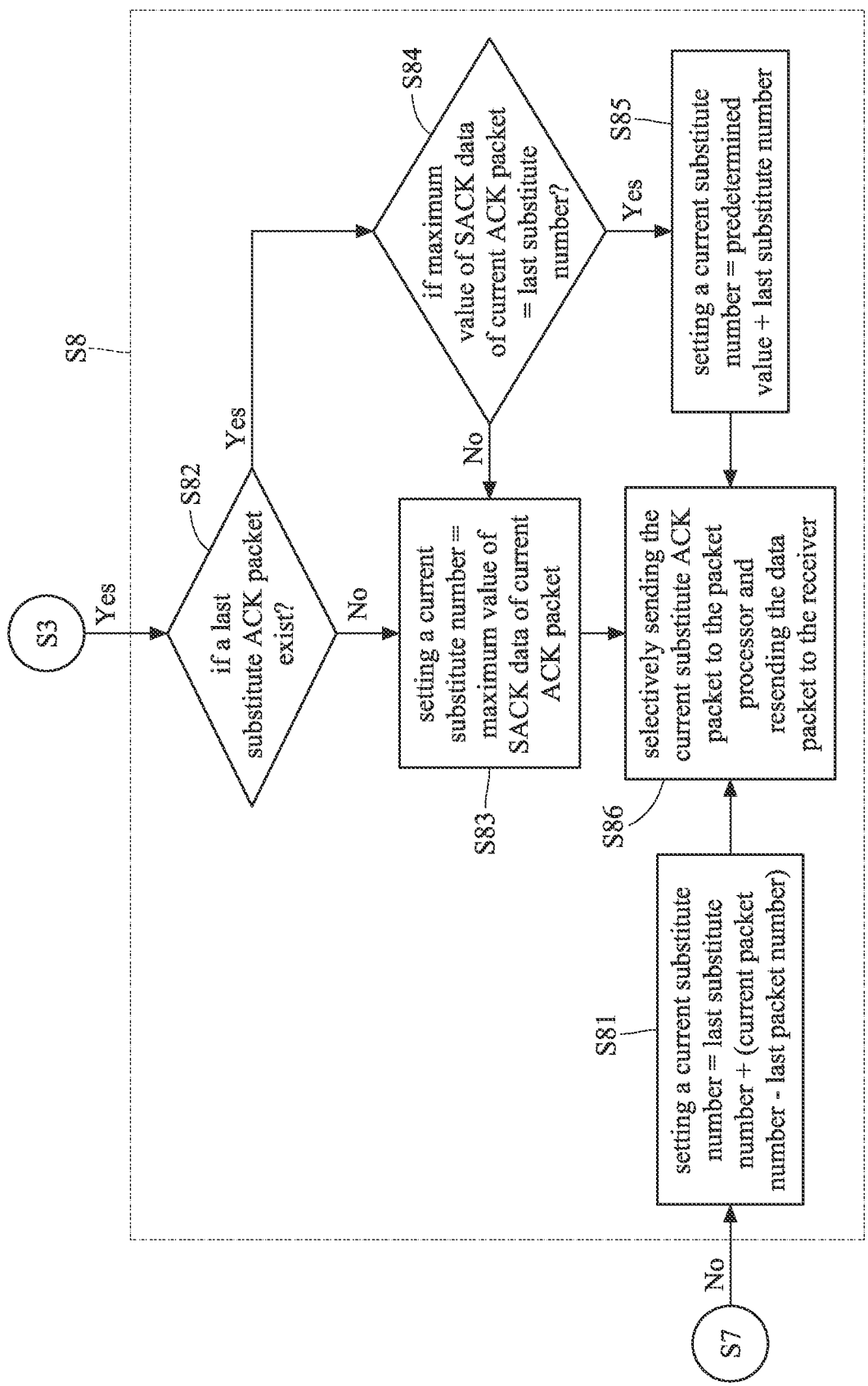
FIG. 5 is a flowchart of an embodiment about the details of Step S8 shown in FIG. 4.

Please refer to FIG. 5 showing details about Step S8, which includes Steps S81-S86. In this embodiment, with Steps S81-S85, depending on different situations, the input ACK filter 12 may set the current substitute number to have different values, so as to avoid the TCP congestion control if the current substitute ACK packet with this current substitute number is sent to the packet processor 2. The Step S86 may include a strategy for determining whether the input ACK filter 12 sends the generated current substitute ACK packet to the packet processor 2 instead of the current ACK packet, and will be illustrated in detail later.

In Step S81, when the current packet number is identified as smaller than the last substitute number in Step S7, the input ACK filter 12 sets a sum of the last substitute number and a difference between the current packet number and the last packet number as the current substitute number. Since, in Step S5, it is identified that the last substitute ACK packet exists and the current packet number is smaller than the last substitute number, the input ACK filter 12 sets the current substitute number to be larger than the last substitute number, or the TCP congestion control can be initiated. Although the difference between the current packet number and the last packet number is applied in this embodiment to serve as an increase from the last substitute number to the current substitute number, this increase is not thus limited.

In Step S82, when the current packet number is determined as identical to the last packet number in Step S3, the input ACK filter 12 further determines whether the last substitute ACK packet exists. Since the current packet number is identical to the last packet number, this current packet number can initiate TCP congestion control if the current ACK packet is sent to the packet processor 2. In order to set the current substitute number to effectively avoid the initiate of TCP congestion control, the input ACK filter 12 further performs this Step S82. The existence of the last substitute ACK packet means that sending an ACK packet with a packet number smaller than or equal to the last substitute number will result in the TCP congestion control. Therefore, after this Step S82, the input ACK filter 12 may set the current substitute number corresponding to the determination result of this Step S82.

In Step S83, when there is no last substitute ACK packet identified in Step S82, the input ACK filter 12 sets the maximum value of SACK data of the current ACK packet to be the current substitute number. Namely, in this embodiment, the current ACK packet may be one like the ACK packet AP1' in FIG. 2A that, for the first time, the SACK data is shown in the ACK packet having the current packet number.

In Step S84, when it is determined that there is the last substitute ACK packet in Step S82, the input ACK filter 12 further determines whether the maximum value of SACK data of the current ACK packet equals the last substitute number. It is possible that the maximum value of SACK data of the current ACK packet is larger than that of the last ACK packet when the packet number of the current and last ACK packets are the same. Therefore, in the situation that the maximum value of SACK data of the current ACK packet is different form the last substitute number, the maximum value of SACK data of the current ACK packet may not yet serve as the value of a packet number of a substitute ACK packet, thus Step S83 takes place to set this maximum value of SACK data of the current ACK packet as the current substitute number. On the contrary, in the situation that the maximum value of SACK data of the current ACK packet equals the last substitute number, the input ACK filter 12 performs the later-introduced Step S85 to avoid sending a substitute ACK packet with a packet number the same to the last substitute number, which may lead to the initiate of TCP congestion control In Step S85, since the maximum value of SACK data of the current ACK packet has been served as the packet number of the last substitute ACK packet, the input ACK filter 12 sets the sum of a predetermined value and the last substitute number of the last substitute ACK packet to be the current substitute number so as to avoid TCP congestion control. The predetermined value can be the smallest data length acceptable to the packet processor 2, such as 1448.

Finally, after either Step S81, Step S83 or Step S85, Step S86 is performed so that the input ACK filter 12 may selectively send the current substitute ACK packet to the packet processor 2 and to let the data packet be accordingly resent to the receiver Rc based on the copy in the output data buffer 11.

Figure 6:
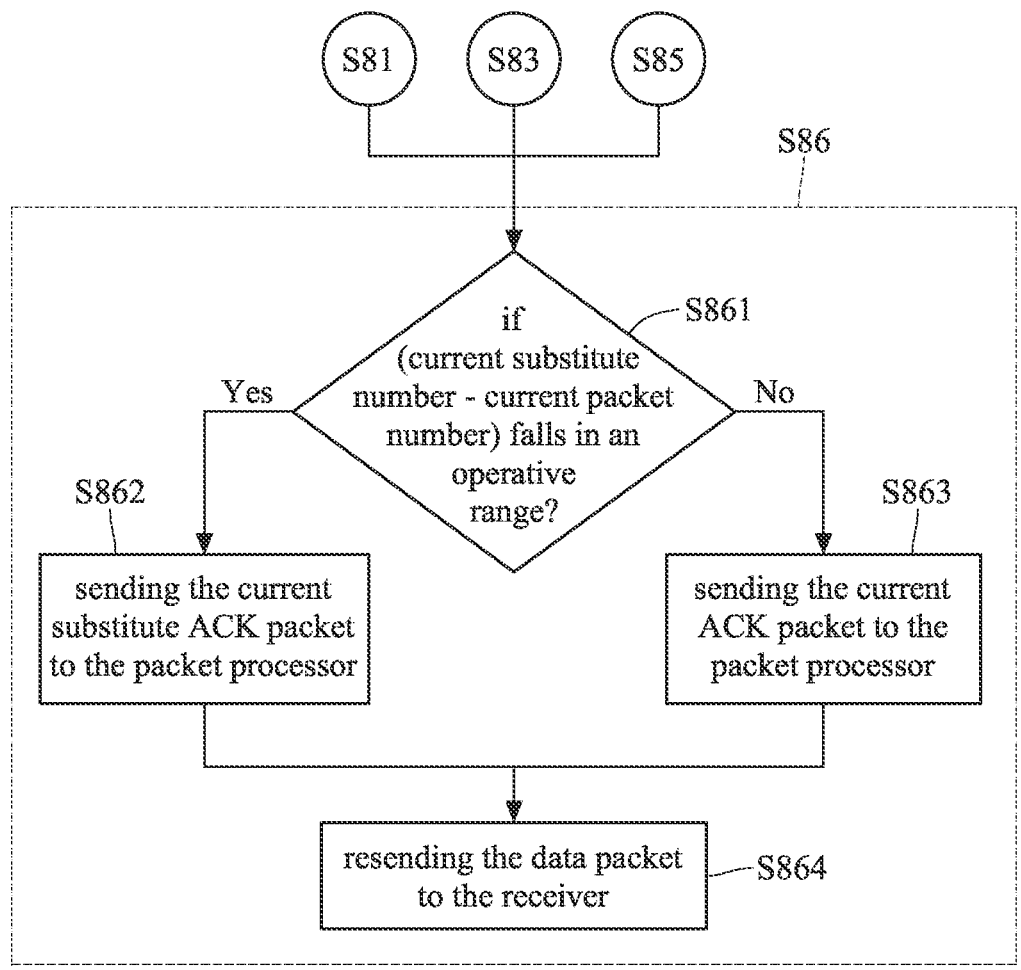
FIG. 6 is a flowchart of an embodiment about the details of Step S86 shown in FIG. 5.

Please refer to FIG. 6, which shows the details of Step S86 with a determination of the packet loss situation in case that the input ACK filter 12 has consequently sent several substrate ACK packets and it is proper for the TCP congestion control to take place in the data transmission. Step S86 may include sub-steps S861-S864 so as to timely introduce the TCP congestion control. In the sub-step S861, the input ACK filter 12 determines whether a difference between the current substitute number of the current substitute ACK packet and the current packet number falls in an operative range, such as equal to or smaller than a predetermined value. In an embodiment, the input ACK filter 12 may subtract the current packet number from the current substitute number and check if the result of this calculation is lower than the predetermined value. In the sub-step S862, when the difference falls in the operative range, which means that it is proper to let the packet processor 2 keep sending data packets normally, the input ACK filter 12 sends the current substitute ACK packet to the packet processor 2. On the contrary, in the sub-step S863, when the difference falls out of the operative range, which means that it is the timing to initiate the TCP congestion control, the input ACK filter 12 sends the current ACK packet to the packet processor 2. Finally, in the sub-step S864, the input ACK filter 12 let the data packet to be resent to the receiver Rc based on the copy in the output data buffer 11. Although it is shown that the sub-step S864 is performed after either the sub-step S862 or the sub-step S863, the sub-step S864 can also be performed before the sub-step S861 or at the same time with the sub-step S861, sub-step S862 or sub-step S863. Thereby, the packet processor 2 can timely initiate the TCP congestion control if the situation of packet loss goes worse.

With the above arrangement, the sender Sd will not easily initiate the TCP congestion control since the packet processor 2 will receive the substitute ACK packet instead of the current ACK packet when the current ACK packet is identified as not larger than the packet number of the last one of the ACK packets sent to the packet processor 2, no matter the last one of the ACK packets is a last ACK packet or a last substitute ACK packet.

The following Table 1 shows the packet loss rates of the disclosure versus various TCP congesting control algorithms, in which the packets are transmitted in the same duration. As shown in Table 1, The comparison results between the disclosure and various TCP congestion control methods (as denoted by X-axis) under different packet loss rates (as denoted by Y-axis) are as follows.

TABLE 1

| Packet loss rate | TCP flow control method | CUBIC | Reno | Vegas | Westwood | BIC |
|---|---|---|---|---|---|---|
| 0% | 942 | 942 | 942 | 942 | 942 | 942 |
| 1% | 820 | 710 | 657 | 423 | 373 | 329 |
| 5% | 763 | 201 | 66 | 34 | 57 | 24 |
| 10% | 521 | 6 | 8 | 4 | 7 | 4 |

Under 0% packet loss rate, the TCP flow control method of the disclosure and all of the TCP congestion control methods can transmit 942 packets within a fixed period. Under 1% packet loss rate, the TCP flow control method can transmit 820 packets within a fixed period, while the CUBIC TCP congestion control transmits 710 packets, Reno TCP congestion control method transmits 657 packets, Vegas TCP congestion control method transmits 423 packets, Westwood TCP congestion control method transmits 373 packets, and the BIC TCP congestion control method transmits 329 packets.

Under 5% packet loss rate, the TCP flow control method transmits 763 packets within a fixed period, while the CUBIC TCP congestion control method transmits 201 packets, Reno TCP congestion control method transmits 66 packets, Vegas TCP congestion control method transmits 34 packets, Westwood TCP congestion control method transmits 57 packets, and BIC TCP congestion control method transmits 24 packets.

Under 10% packet loss rate, the TCP flow control method can transmit 521 packets within a fixed period, while the CUBIC TCP congestion control method transmits 6 packets, Reno TCP congestion control method transmits 8 packets, Vegas TCP congestion control method transmits 4 packets, Westwood TCP congestion control method transmits 7 packets, and BIC TCP congestion control method transmits 4 packets.

Please further refer to Table 2, which shows the packet loss rates and corresponding transmission rates of the TCP flow control method versus the CUBIC algorithm. As shown in Table 2, the results of comparison between the TCP flow control method and TCP CUBIC congestion control method (as denoted by X-axis) under different packet loss rates (as denoted by Y-axis) are as follows.

TABLE 2

| Packet loss rate | TCP flow control method | CUBIC |
|---|---|---|
| 0% | 12.64 sec (897 Mbits/sec) | 12.64 sec (897 Mbits/sec) |
| 1% | 15.55 sec (729 Mbits/sec) | 19.74 sec (585 Mbits/sec) |
| 5% | 17.42 sec (661 Mbits/sec) | 42.51 sec (268 Mbits/sec) |
| 10% | 29.86 sec (381 Mbits/sec) | 596.75 sec (19 Mbits/sec) |

Under 0% packet loss rate, both the TCP flow control method and the CUBIC TCP congestion control method consume 12.64 seconds on transmitting a fixed number of packets (i.e. 897 Mbits/sec).

Under 1% packet loss rate, the TCP flow control method consumes 15.55 seconds on transmitting a fixed number of packets (i.e. 729 Mbits/sec), while it takes the CUBIC TCP congestion control method 19.74 seconds (i.e. 585 Mbits/sec) to finish the same task.

Under 5% packet loss rate, the TCP flow control method consumes merely 17.42 seconds on transmitting a fixed number of packets (i.e. 661 Mbits/sec), while it takes the CUBIC TCP congestion control method 42.51 seconds (i.e. 268 Mbits/sec) to finish the same task.

Under 10% packet loss rate, the TCP flow control method consumes merely 29.86 seconds on transmitting a fixed number of packets (i.e. 381 Mbits/sec), while it takes the CUBIC TCP congestion control method 596.7 seconds (i.e. 19 Mbits/sec) to finish the same task.

As can be seen from Tables 1 and 2, the TCP flow control method can fix the issue of improper speed limiting mechanism in 5G wireless communications system, thus greatly improving the user experience while the TCP congestion control can still be enable whenever there is an actual need.

In view of the above, the disclosure provides a TCP flow control method and a TCP flow control device, which is capable to be a TCP flow control mechanism to prevent TCP data transmission from entering the congestion control state, so that the optimal transmission speed can be ensured and it is better than other TCP congestion control algorithms.

Although the disclosure is disclosed as above in the foregoing embodiments, this is not intended to limit the disclosure. Without departing from the spirit and scope of the disclosure, all changes and modifications made based on the disclosure shall fall within the claimed scope of the disclosure. As to the actual scope defined by the disclosure, please refer to the attached claims.

What is claimed is:

1. A transmission control protocol (TCP) flow control method, comprising:
   sending a data packet from a packet processor to a receiver and storing a copy of the data packet in an output data buffer;
   receiving a current ACK packet with a current packet number by an input ACK filter after the data packet is sent;
   determining whether the current packet number is identical to a last packet number of a last ACK packet and whether a last substitute ACK packet with a last substitute number exists by the input ACK filter;
   when the current packet number is different from the last packet number and there is no last substitute ACK packet, sending the current ACK packet to the packet processor by the input ACK filter;
   when the current packet number is different from the last packet number and the last substitute ACK packet exists, determining whether the current packet number is larger than or equal to the last substitute number by the input ACK filter;
   when the current packet number is determined as larger than or equal to the last substitute number, sending the current ACK packet to the packet processor by the input ACK filter; and
   when the current packet number is identical to the last packet number or when the current packet number is determined as smaller than the last substitute number, resending the data packet to the receiver, generating a current substitute ACK packet, and selectively sending the current substitute ACK packet to the packet processor,
   wherein selectively sending the current substitute ACK packet to the packet processor comprises:
      determining whether a difference between a current substitute number and the current packet number falls in an operative range;
      sending the current substitute ACK packet to the packet processor when the difference falls in the operative range; and
      sending the current ACK packet to the packet processor when the difference falls out of the operative range.

2. The TCP flow control method according to claim 1, wherein generating the current substitute ACK packet comprises:
   when the current packet number is identified as smaller than the last substitute number, setting a sum of the last substitute number and a difference between the current packet number and the last packet number as the current substitute number by the input ACK filter, with the current substitute number serving as a packet number of the current substitute ACK packet;
   when the current packet number is determined as identical to the last packet number and the last substitute ACK packet exists, determining whether a maximum value of selective acknowledgement (SACK) data of the current ACK packet equals the last substitute number by the input ACK filter;
   when the maximum value of SACK data of the current ACK packet is different from the last substitute number or when the current packet number is determined as identical to the last packet number and there is no last substitute ACK packet, setting the maximum value of SACK data of the current ACK packet as the current substitute number by the input ACK filter; and
   when the maximum value of SACK data of the current ACK packet equals the last substitute number, setting the sum of a predetermined value and the last substitute number as the current substitute number by the input ACK filter.

3. The TCP flow control method according to claim 1 further comprising deleting the copy of the data packet in the output data buffer when the current packet number is different from the last packet number.

4. The TCP flow control method according to claim 3, wherein deleting the copy of the data packet in the output data buffer comprises:
   sending a deleting command to the output data buffer by the input ACK filter; and
   deleting the copy of the data packet in the output data buffer according to the deleting command received thereby.

5. The TCP flow control method according to claim 1, wherein resending the data packet to the receiver comprises:
   sending a resending command to the output data buffer by the input ACK filter; and
   according to the copy, resending the data packet by the output data buffer after the output data buffer receives the resending command.

6. A transmission control protocol (TCP) flow control device, comprising:
   an output data buffer configured to communicatively connect between a packet processor and a receiver, wherein the output data buffer stores a copy of a data packet sent from the packet processor to the receiver, and, based on the copy, resends the data packet to the receiver when receiving a resending command; and
   an input ACK filter configured to communicatively connect to the output data buffer and between the packet processor and the receiver, wherein the input ACK filter receives a current ACK packet with a current packet number, and determines whether the current packet number is identical to a last packet number of a last ACK packet and whether a last substitute ACK packet with a last substitute number exists by the input ACK filter;
   wherein, when the current packet number is different from the last packet number and there is no last substitute ACK packet, the input ACK filter sends the current ACK packet to the packet processor; when the current packet number is different from the last packet number and the last substitute ACK packet exists, the input ACK filter determines whether the current packet number is larger than or equal to the last substitute number; when the current packet number is determined as larger than or equal to the last substitute number, the input ACK filter sends the current ACK packet to the packet processor; when the current packet number is identical to the last packet number or when the current packet number is determined as smaller than the last substitute number, the output data buffer resends the data packet to the receiver, and the input ACK filter generates a current substitute ACK packet and selectively sends the current substitute ACK packet to the packet processor,
   wherein, for generating the current substitute ACK packet, the input ACK filter sets a sum of the last substitute number and a difference between the current packet number and the last packet number as a current substitute number when the current packet number is identified as smaller than the last substitute number, when the current packet number is determined as identical to the last packet number and the last substitute ACK packet exists, determines whether a maximum value of selective acknowledgement (SACK) data of the current ACK packet equals the last substitute number when the current packet number is determined as identical to the last packet number and the last substitute ACK packet exists, sets the maximum value of SACK data of the current ACK packet as the current substitute number when the maximum value of SACK data of the current ACK packet is different from the last substitute number or when the current packet number is determined as identical to the last packet number and there is no last substitute ACK packet, and sets the sum of a predetermined value and the last substitute number as the current substitute number when the maximum value of SACK data of the current ACK packet equals the last substitute number, with the current substitute number serving as a packet number of the current substitute ACK packet.

7. A transmission control protocol (TCP) flow control device, comprising:

an output data buffer configured to communicatively connect between a packet processor and a receiver, wherein the output data buffer stores a copy of a data packet sent from the packet processor to the receiver, and, based on the copy, resends the data packet to the receiver when receiving a resending command; and an input ACK filter configured to communicatively connect to the output data buffer and between the packet processor and the receiver, wherein the input ACK filter receives a current ACK packet with a current packet number, and determines whether the current packet number is identical to a last packet number of a last ACK packet and whether a last substitute ACK packet with a last substitute number exists by the input ACK filter;

wherein, when the current packet number is different from the last packet number and there is no last substitute ACK packet, the input ACK filter sends the current ACK packet to the packet processor; when the current packet number is different from the last packet number and the last substitute ACK packet exists, the input ACK filter determines whether the current packet number is larger than or equal to the last substitute number; when the current packet number is determined as larger than or equal to the last substitute number, the input ACK filter sends the current ACK packet to the packet processor; when the current packet number is identical to the last packet number or when the current packet number is determined as smaller than the last substitute number, the output data buffer resends the data packet to the receiver, and the input ACK filter generates a current substitute ACK packet and selectively sends the current substitute ACK packet to the packet processor, wherein, for selectively sending the current substitute ACK packet to the packet processor, the input ACK filter determines whether a difference between a current substitute number and the current packet number falls in an operative range, sends the current substitute ACK packet to the packet processor when the difference falls in the operative range, and sends the current ACK packet to the packet processor when the difference falls out of the operative range.

8. The TCP flow control device according to claim 6, wherein the output data buffer further deletes the copy when receiving a deleting command from the input ACK filter, and the input ACK filter generates the deleting command when the current packet number is different from the last packet number.

9. The TCP flow control device according to claim 7, wherein the output data buffer further deletes the copy when receiving a deleting command from the input ACK filter, and the input ACK filter generates the deleting command when the current packet number is different from the last packet number.

* * * * *